US006438283B1

(12) United States Patent
Karaguleff (10) Patent No.: US 6,438,283 B1
(45) Date of Patent: Aug. 20, 2002

(54) FRUSTRATED TOTAL INTERNAL REFLECTION SWITCH USING DOUBLE PASS REFLECTION AND METHOD OF OPERATION

(75) Inventor: Chris Karaguleff, Austin, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/415,506

(22) Filed: Oct. 8, 1999

(51) Int. Cl.[7] ................................. G02B 6/26
(52) U.S. Cl. ............................ 385/18; 385/22; 385/33; 385/34
(58) Field of Search ............................ 385/16–23, 33, 385/34

(56) References Cited

U.S. PATENT DOCUMENTS

| | | |
|---|---|---|
| 4,261,638 A | 4/1981 | Wagner |
| 4,521,069 A | 6/1985 | Ikeda .................... 350/96.13 |
| 4,796,263 A | 1/1989 | Rampolla ................... 372/10 |
| 5,221,987 A | 6/1993 | Laughlin ................... 359/222 |
| 5,361,315 A | 11/1994 | Lewis et al. |
| 5,369,718 A | 11/1994 | Kamata et al. ............. 385/21 |
| 5,444,801 A | 8/1995 | Laughlin ................... 385/16 |
| 5,553,175 A | 9/1996 | Laughlin ................... 385/16 |
| 5,555,327 A | 9/1996 | Laughlin ................... 385/16 |
| 5,555,558 A | 9/1996 | Laughlin ................... 385/16 |
| 5,566,260 A | 10/1996 | Laughlin ................... 385/16 |
| 5,640,479 A | 6/1997 | Hegg et al. ................ 385/120 |
| 5,647,033 A | 7/1997 | Laughlin ................... 385/16 |
| 5,699,462 A | 12/1997 | Fouquet et al. ............ 385/18 |
| 5,732,168 A | 3/1998 | Donald ..................... 385/16 |
| 5,828,799 A | 10/1998 | Donald ..................... 385/16 |
| 5,841,916 A | 11/1998 | Laughlin ................... 385/16 |
| 5,875,271 A | 2/1999 | Laughlin ................... 385/16 |
| 5,909,301 A | 6/1999 | Laughlin ................... 359/222 |
| 5,917,641 A | 6/1999 | Laughlin ................... 359/222 |
| 6,101,299 A * | 8/2000 | Laor |
| 6,175,667 B1 * | 1/2001 | Wang et al. |

FOREIGN PATENT DOCUMENTS

| | | | |
|---|---|---|---|
| DE | 32 14 042 A1 | 10/1983 | |
| EP | 0 382 613 | 8/1990 | ............ G02B/6/36 |
| WO | WO 93/04388 | 3/1993 | |
| WO | WO 98/10321 | 3/1998 | ............ G02B/26/02 |
| WO | WO 00/03279 | 1/2000 | |
| WO | WO 00/73840 A1 | 12/2000 | |

OTHER PUBLICATIONS

Toshiyoshi, et al., "Electrostatic Micro Torsion Mirrors for an Optical Switch Matrix", IEEE Journal of Microelectromechanical Systems, vol. 5, No. 4, Dec. 1996, pp. 231–237.

U.S. Patent application Ser. No. 09/111,455, entitled "Method and Apparatus for Aligning Optical Fibers," filed Jul. 8, 1998.

U.S. Patent application Ser. No. 09/111,570, entitled "Method and Apparatus for Connecting Optical Fibers," filed Jul. 8, 1998.

(List continued on next page.)

*Primary Examiner*—Hung N. Ngo
(74) *Attorney, Agent, or Firm*—Baker Botts L.L.P.

(57) ABSTRACT

An optical switch for processing an optical signal includes a refractive material having a first surface, a second surface, and a third surface. A first embodiment of the optical switch includes a lens having a planar surface that is coupled to the third surface of the refractive material, and a convex surface. A second embodiment of the optical switch includes a collimating lens, a first decollimating lens, and a second decollimating lens. The optical switch further includes a switchplate coupled to the second surface of the refractive material. The switchplate has a first position spaced apart from the second surface and a second position in proximal contact with the second surface.

40 Claims, 7 Drawing Sheets

OTHER PUBLICATIONS

U.S. Patent application Ser. No. 09/111,571, entitled "Method and Apparatus for Aligning Optical Fibers Using an Alignment Spacer," Jul. 8, 1998.

Invitation to Pay Additional Fees Search in International Application No. PCT/US 00/27511, dated Apr. 3, 2001, 5 pages.

U.S. Patent application Ser. No. 09/212,616, entitled "Frustrated Total Internal Reflection Bus and Method of Operation," filed Dec. 16, 1998.

U.S. Patent application Ser. No. 09/244,570, entitled "System and Method for Determining the Condition of an Optical Switch," filed Feb. 4, 1999.

U.S. Patent application Ser. No. 09/483,742, entitled "System and Method for Beam–Steering Using a Reference Signal Feedback," filed Jan. 17, 2000.

* cited by examiner

FRUSTRATED TOTAL INTERNAL REFLECTION SWITCH USING DOUBLE PASS REFLECTION AND METHOD OF OPERATION

TECHNICAL FIELD OF THE INVENTION

This invention relates to the field of frustrated total internal reflection devices and more particularly to a frustrated total internal reflection switch using double pass reflection and method of operation.

BACKGROUND OF THE INVENTION

Fiber-optic communication systems include optical components, such as optical fibers coupled to switching components, that receive, transmit, and otherwise process information in optical signals. The switching components in a fiber-optic communication system selectively direct the information carried by the optical signal to one or more other optical components. A problem with existing fiber-optic communication systems is that a portion of the information in the optical signal may not reach its intended destination. One reason for this is that the optical signal experiences some loss or leakage during the switching operations due to imperfections in the optical components, or in the switch actuation device, that cause the optical signal to reflect in an undesired manner. The undesired signals produced as a result of these problems are commonly referred to as cross-talk. There is a need in the field of fiber-optic communication systems to reduce the effects of cross-talk.

One attempt to reduce cross-talk in fiber-optic communication systems requires the optical components and actuation devices to be manufactured according to precise specifications having small tolerances for error. A drawback to this approach is that manufacturing optical components and actuation devices according to strict specifications is expensive, time-consuming, and sometimes unattainable. When the small tolerances are not realized in the optical components, the result is a misaligned signal or cross-talk. There is therefore a need in the field of fiber-optic communications to relax the precise manufacturing specifications of optical components while reducing the effects of cross-talk.

SUMMARY OF THE INVENTION

A frustrated total internal reflection switch using double pass reflection is provided that substantially eliminates or reduces disadvantages and problems associated with previous optical switches.

In accordance with one embodiment of the present invention, an optical switch for processing an optical signal includes a refractive material having a first surface, a second surface, and a third surface. The optical switch also includes a lens having a planar surface that is coupled to the third surface of the refractive material and a convex surface. The optical switch further includes a switchplate coupled to the second surface of the refractive material. The switchplate has a first position spaced apart from the second surface such that the second surface totally internally reflects optical signal toward the convex surface of the lens, and the second surface totally internally reflects the optical signal reflected by the convex surface to a first output optical device. The switchplate has a second position in proximal contact with the second surface to frustrate the total internal reflection of the optical signal such that the switchplate totally internally reflects the optical signal toward the convex surface of the lens, and the switchplate totally internally reflects the optical signal reflected by the convex surface toward a second output optical device.

Another embodiment of the present invention is a method for processing an optical signal that includes receiving the optical signal at a first surface of a refractive material. The optical signal diverges as it propagates toward the first surface of the refractive material. The method continues by totally internally reflecting the optical signal at a second surface of the refractive material toward a lens coupled to the third surface of the refractive material, wherein the lens comprises a convex surface. The method continues by reflecting the optical signal at the convex surface toward the second surface of the refractive material. The method concludes by totally internally reflecting the optical signal at the second surface of the refractive material such that the optical signal converges toward an output optical device.

Yet another embodiment of the present invention is an optical switch for processing an optical signal that includes a refractive material having a first surface, a second surface, and a third surface. A collimating lens couples to the first surface of the refractive material. A first decollimating lens couples to the first surface of the refractive material. A second decollimating lens couples to the first surface of the refractive material. A switchplate couples to the second surface of the refractive material and has a first position spaced apart from the second surface such that the second surface totally internally reflects a collimated beam toward the third surface of the refractive material and the second surface totally internally reflects the collimated beam reflected by the third surface to a first output optical device coupled to the first decollimating lens. The switchplate has a second position in proximal contact with the second surface to frustrate the total internal reflection of the collimated beam such that the switchplate totally internally reflects the collimated beam toward the third surface and the switchplate totally internally reflects the collimated beam reflected by the third surface toward a second output optical device coupled to the second decollimating lens.

A technical advantage of the present invention includes one embodiment of a frustrated total internal reflection optical switch that includes a refractive material, a switchplate coupled to the refractive material, and a lens with a convex surface that reflects a diverging input optical signal such that it converges toward an output optical device. This particular embodiment of the optical switch eliminates the use of collimating and decollimating lenses so that the optical switch can be constructed using fewer components which may reduce the packing density of the switch.

While in a switched state, the switchplate of the optical switch is typically placed in proximal contact with a surface of the refractive material to frustrate the total internal reflection of the optical signal. A small portion of the optical signal may be totally internally reflected, however, at the surface of the refractive material and processed as though the switch is operating in the unswitched state. This undesired result is commonly referred to as a cross-talk signal. The negative effects of the cross-talk signal are realized if an optical device of the switch receives and further processes the cross-talk signal.

Another technical advantage offered by the present invention is that the optical switch reduces the effects of a cross-talk signal. In particular, the optical switch of the present invention further processes any cross-talk signals so that a large portion of the cross-talk signal is not received by an optical device of the optical switch. The negative effects of the cross-talk signal are thereby reduced. For example, in the switched state, a cross-talk signal resulting from residual reflection at the interface between a surface of the refractive material and the switchplate is reflected back by the lens toward the switchplate. The switchplate placed in proximal contact with the surface of the refractive material frustrates the total internal reflection of most of the cross-talk signal reflected by the lens such that the signal is totally internally reflected by a reflective surface of the switchplate away from any optical devices.

Upon reflection by the lens, only a small, residual portion of the original optical signal is totally internally reflected at the interface between the surface of the refractive material and the switchplate as though the switch was operating in the unswitched mode. Therefore, only a negligible portion of the original optical signal, if any, comprises a cross-talk signal that may actually reach an optical device of the switch. Thus, the cross-talk signal is dissipated and its effects become negligible. The reduction in the magnitude of the cross-talk signal in the present invention will be referred to as a cross-talk improvement and generally results from the repeated reflection of the optical signal at the interface between the refractive material and the switchplate. Such a repeated reflection of the optical signal described above will be generally referred to as a "double pass reflection."

Another important advantage of the optical switch relates to the cross-talk improvement described above. Generally, the cross-talk signal described above is generated as a result of imperfections in the components of the optical switch, such as imperfections in the surfaces of the switchplate and the refractive material, or in less than ideal actuator performance which results in a slight air gap at the interface between the switchplate and prism. By reducing the magnitude of cross-talk signals to acceptable levels during the operation of the optical switch using the double pass reflection technique described above, manufacturing tolerances for the components used in the switch may be increased, and components are thus easier and less costly to manufacture. For example, the surface of the refractive material and the switchplate may be constructed with increased surface roughness and still meet industry standards in reducing the effects of cross-talk. Also, components having a larger degree of environmental contamination can be used, and still provide acceptable cross-talk performance during the operation of the switch. Furthermore, operational tolerances for components of the optical switch, such as the actuator, may be increased.

In addition to supporting increased manufacturing tolerances for optical components, the double pass reflection techniques of the present invention allows actuator performance requirements to be relaxed. For example, the degree of proximal contact to which the actuator brings the switchplate and the surface of the refractive material may be relaxed and still provide acceptable cross-talk performance during the operation of the switch.

The convex surface of the lens in the optical switch reflects a diverging input optical signal such that it converges at a focal point. The position of the focal point is based upon a radius of curvature of the convex surface of the lens, the thickness of the switchplate, or both depending upon the mode of operation. The output optical device intended to receive the output optical signal should be substantially coincident with the focal point of the signal so that the device can receive a maximum amount of the signal. In prior fiber-optic communication systems, once the switch is manufactured, the positions of the output optical devices are fixed based upon a calculated position for the focal point of the optical signal. Manufacturing defects associated with components of which the switch is constructed may cause the actual focal point to be somewhere other than the calculated position of the focal point so that the output optical devices of the switch are misaligned.

Another technical advantage of the present invention is the use of tuning spacers that overcome misalignment problems associated with prior optical switches. In particular, the tuning spacers of the present invention may position the output optical devices of the switch even after the switch is manufactured. Thus, even if the precise specifications of the optical components have not been met, causing a deviation in the focal point of the signal and resulting in misalignment of the output devices, a tuning spacer may controllably position an output optical device substantially coincident with the actual focal point of an output optical signal. Furthermore, should the connections in the optical switch loosen due to jarring or prolonged operation, the tuning spacers support the periodic repositioning of the output optical devices so as to avoid the expense of replacing the switch.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1A:
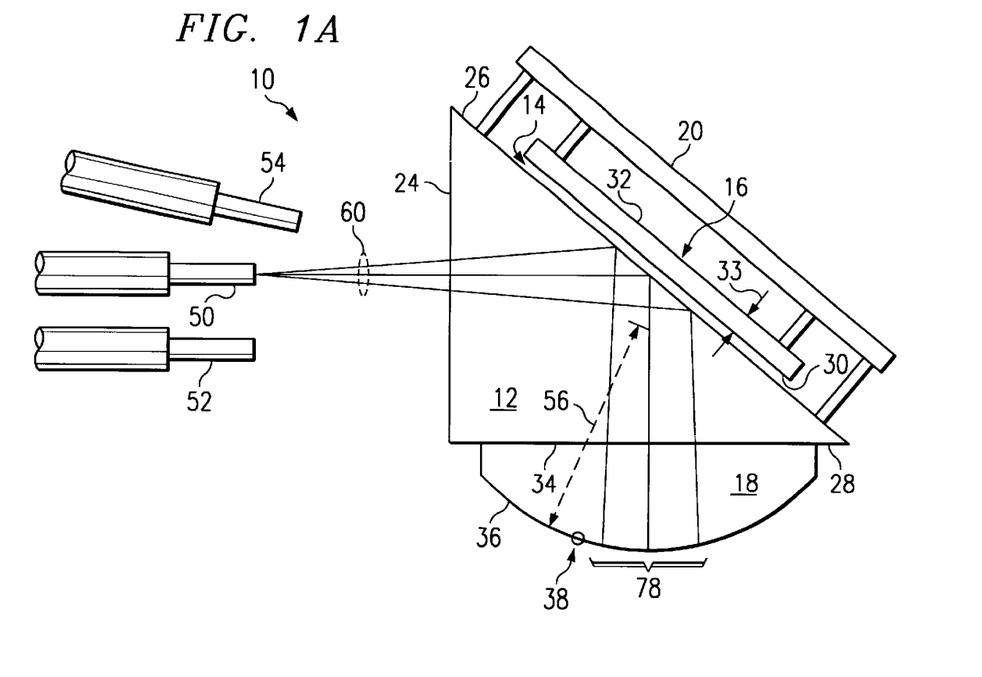
FIGS. 1A and 1B illustrate a first embodiment of an optical switch operating in an unswitched mode in accordance with the present invention.
Figure 1B:
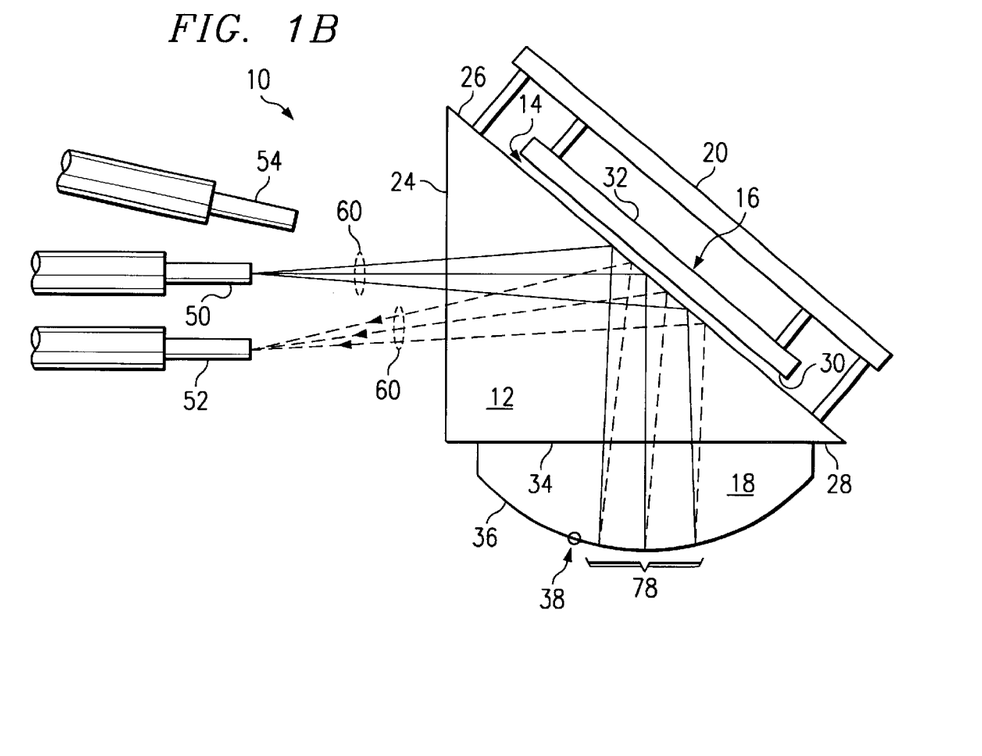

FIGS. 1A and 1B illustrate a frustrated total internal reflection (FTIR) optical switch 10 that includes a first refractive material 12, a second refractive material 14, a switchplate 16 that couples to material 12 using an actuator 20, and a lens 18 that has a convex surface 36. In general, optical switch 10 receives an optical signal 60 from an input optical device 50. Based upon the position of switchplate 16, optical switch 10 selectively communicates signal 60 to output optical devices 52 and/or 54.

First refractive material 12 comprises a rhomboid, a prism, or any other suitable configuration of optically transmissive material, such as glass. Material 12 includes a first surface 24, a second surface 26, and a third surface 28. Material 12 may be selected to provide a particular index of refraction, $n_1$, at a particular wavelength of optical signal 60.

Second refractive material 14 comprises air or any other suitable substance that has an index of refraction, $n_2$, lower than that of material 12. Accordingly, if optical signal 60 propagates from first surface 24 to second surface 26 of material 12 at an angle equal to or above a critical angle of refraction associated with the interface between materials 12 and 14, then second surface 26 totally internally reflects optical signal 60 toward lens 18 coupled to the third surface 28 of material 12. Second surface 26 of material 12 therefore reflects optical signal 60 by total internal reflection (TIR).

Switchplate 16 is coupled to second surface 26 and comprises any suitable refractive material having a contact surface 30 and a reflective surface 32 to define a thickness 33. The index of refraction of switchplate 16 is substantially similar to the index of refraction of material 12. Switchplate 16 may be formed in many configurations without deviating from the inventive concepts of the present invention. In one embodiment of switchplate 16, reflective surface 32 is substantially parallel to contact surface 30. The reflectivity of surface 32 may be caused by total internal reflection or by a reflective material.

Switchplate 16 has a first position spaced apart from material 12 and a second position in proximal contact with material 12 to frustrate the total internal reflection of signal 60. Optical switch 10 communicates optical signal 60 to a first output optical device 52 when switchplate 16 is spaced apart from material 12, as described with reference to FIGS. 1A and 1B. When switchplate 16 is placed in proximal contact with material 12, optical switch 10 communicates optical signal 60 to a second output optical device 54 as described in greater detail with reference to FIGS. 2A and 2B. The term "proximal contact" refers not only to direct contact between switchplate 16 and material 12, but also contemplates any spacing or partial contact between switchplate 16 and material 12 to frustrate the total internal reflection of optical beam 60 to a desired degree.

Actuator 20 comprises a piezoelectric device, a bimorph transducer, or any other suitable material that displaces switchplate 16 in response to an electrical, thermal, or otherwise appropriate control signal. Activating and deactivating actuator 20 coupled to switchplate 16 causes actuator 20 to bring switchplate 16 into and out of proximal contact with material 12. U.S. Pat. Nos. 5,555,327and 5,909, 301disclose a variety of techniques and components to construct switchplate 16, actuator 20, and combinations thereof that may be used with optical switch 10, and are herein incorporated by reference.

Lens 18 comprises any suitable optically transmissive material having a planar surface 34 and a convex surface 36. Planar surface 34 of lens 18 is coupled to third surface 28 of material 12. The convex surface 36 of lens 18 has a coating 38 that reflects optical signal 60. Coating 38 may be any suitable material that increases the reflectivity of surface 36. Convex surface 36 of lens 18 is formed having a radius of curvature 56. Convex surface 36 of lens 18 reflects signal 60 such that it converges toward a focal point as it propagates toward devices 52 and/or 54. The position of the focal point to which signal 60 focuses is based upon the radius of curvature 56 of convex surface 36 and, in one mode of operation, the thickness 33 of switchplate 16.

Input optical device 50 and output optical devices 52 and 54 may comprise any suitable device or component capable of transmitting or receiving optical signal 60, such as optical fibers. For example, devices 50–54 may comprise single-mode or multi-mode optical fibers for use with switch 10. In one embodiment of optical switch 10, the position of output optical device 52 with respect to input optical device 50 is determined in response to radius of curvature 56 of convex surface 36. The position of output optical device 54 with respect to input optical device 50 is determined in response to radius of curvature 56 of convex surface 36 and thickness 33 of switchplate 16. Optical signal 60 comprises visible light, infrared radiation, ultra-violet radiation, or any other suitable optical beam. In one embodiment of switch 10, as described with reference to FIGS. 1–4, optical signal 60 comprises a diverging optical beam. In another embodiment of switch 10, as described with reference to FIGS. 5–7, optical signal 60 comprises a collimated optical beam.

In operation of optical switch 10 with switchplate 16 spaced apart from second surface 26 of material 12, as illustrated in FIG. 1A, optical switch 10 receives optical signal 60 from device 50 such that signal 60 propagates through first surface 24 and toward second surface 26. In one embodiment, signal 60 diverges as it propagates toward surfaces 24 and 26 of material 12. Total internal reflection at the interface between material 14 and second surface 26 of material 12 directs optical signal 60 toward a plurality of first positions 78 on convex surface 36 of lens 18.

Referring to FIG. 1B, convex surface 36 of lens 18 reflects optical signal 60 such that signal 60 converges toward second surface 26 of material 12. The reflected signal 60 is illustrated using dashed lines. Total internal reflection at second surface 26 directs signal 60 toward first surface 24 such that signal 60 converges toward a first output optical device 52. Therefore, FIGS. 1A and 1B together illustrate the operation of switch 10 with switchplate 16 spaced apart from material 12.

Figure 2A:
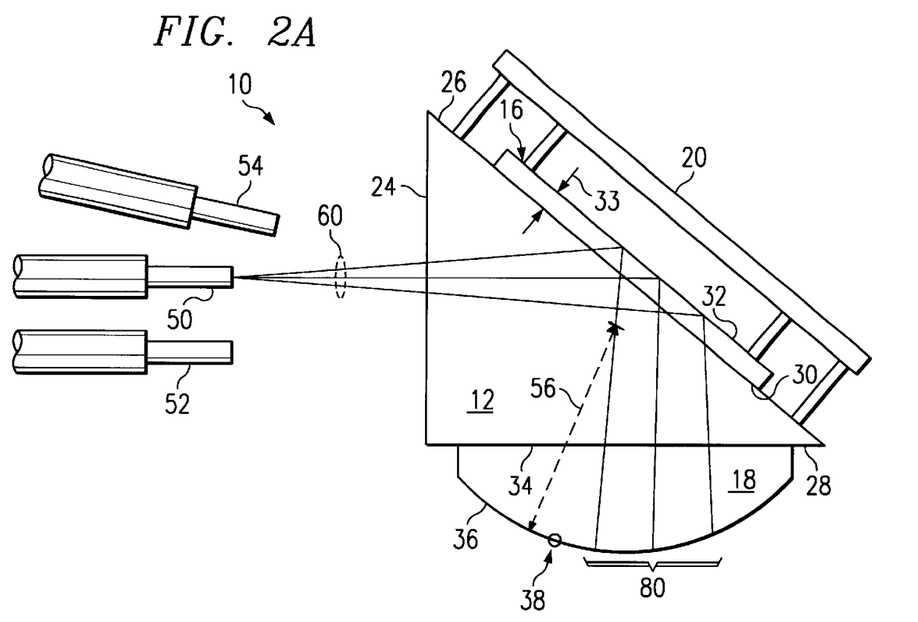
FIGS. 2A and 2B illustrate the first embodiment of the optical switch operating in a switched mode.

In operation of switch 10 with switchplate 16 placed in proximal contact with material 12, as illustrated in FIG. 2A, optical switch 10 receives optical signal 60 from device 50 such that signal 60 propagates through first surface 24 and toward second surface 26. Actuator 20 places switchplate 16 in proximal contact with surface 26 of material 12. Switchplate 16 frustrates the total internal reflection of optical signal 60 at surface 26. Reflective surface 32 of switchplate 16 directs optical signal 60 toward a plurality of second positions 80 on convex surface 36 of lens 18.

Figure 2B:
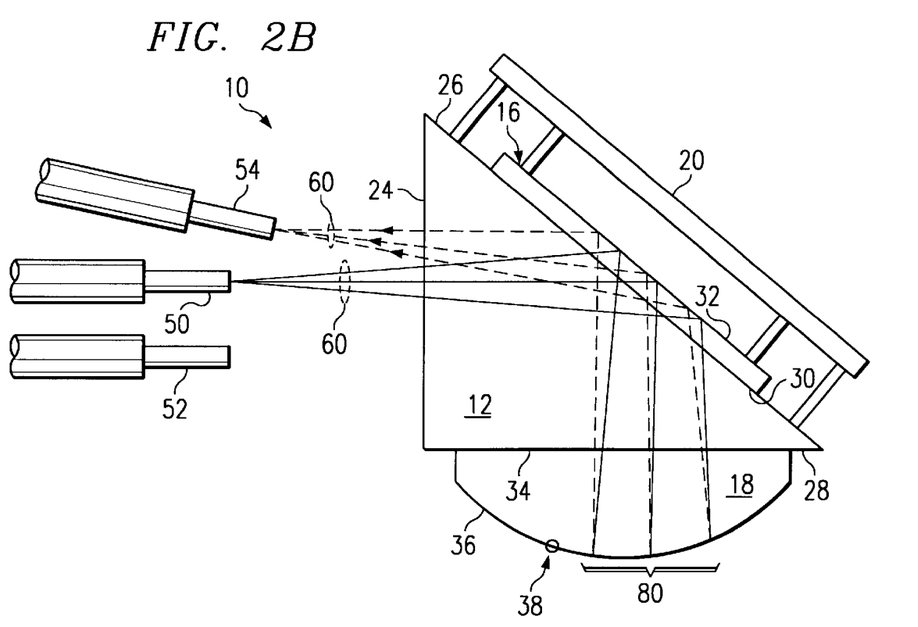

Referring to FIG. 2B, convex surface 36 of lens 18 reflects optical signal 60 such that signal 60 (illustrated using dashed lines) converges toward second surface 26 of material 12. Switchplate 16 again frustrates the total internal reflection of signal 60 at surface 26. Reflective surface 32 of switchplate 16 directs optical signal 60 toward first surface 24 of material 12 such that signal 60 converges toward second output optical device 54. Therefore, FIGS. 2A and 2B together illustrate the operation of switch 10 with switchplate 16 placed in proximal contact with material 12.

Figure 3A:
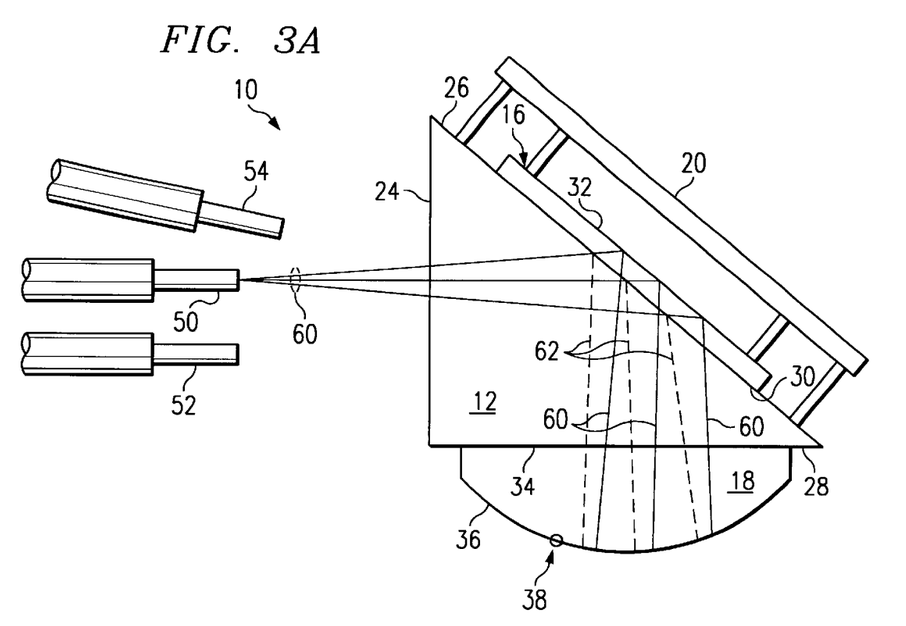
FIGS. 3A and 3B illustrate the first embodiment of the optical switch processing a cross-talk signal.
Figure 3B:
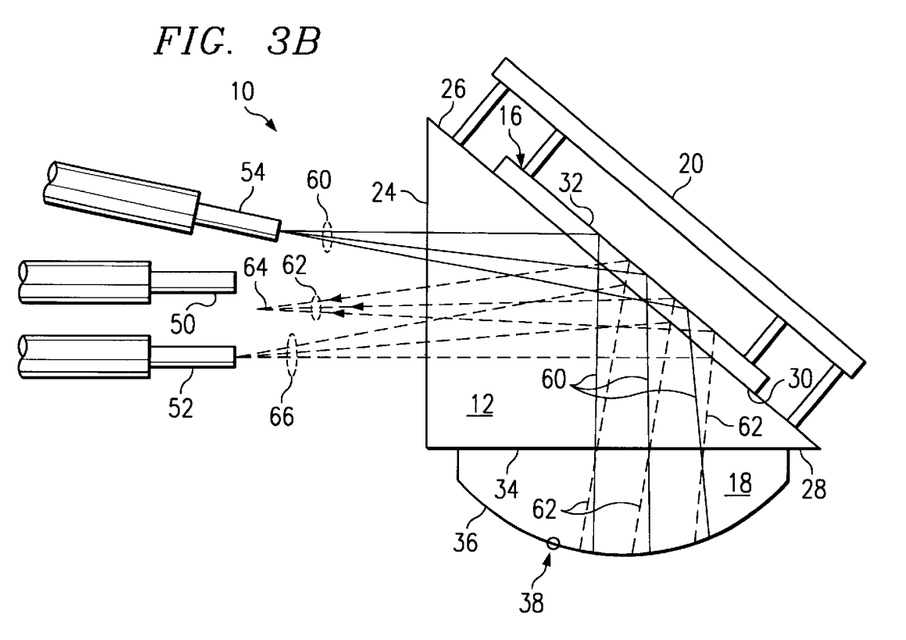

FIGS. 3A and 3B illustrate an advantageous operation of switch 10 that reduces the effects of cross-talk signals. Referring to FIG. 3A, in operation of switch 10 with switchplate 16 placed in proximal contact with material 12, optical switch 10 receives optical signal 60 such that it propagates through first surface 24 and toward second surface 26. Ideally, switchplate 16 frustrates the total internal reflection of the entire signal 60 at surface 26 such that signal 60 is reflected by surface 32 of switchplate 16, as illustrated using solid lines for signal 60. Total internal reflection of a small, residual portion of signal 60 at second surface 26 of material 12 results in a first cross-talk signal 62, as illustrated using dashed lines. Therefore, FIG. 3A illustrates the effects of a first reflection of signal 60 at the interface between surface 26 and switchplate 16. The negative effects of cross-talk signal 62 are realized if an optical device 50–54 receives and further processes signal 62. A particular advantage provided by the present invention is that switch 10 further processes cross-talk signal 62 so that a large portion of cross-talk signal 62 is not received by input device 50, output devices 52 or 54, or any other optical component of switch 10.

Referring to FIG. 3B, convex surface 36 of lens 18 reflects signals 60 and 62 toward second surface 26 for a second reflection at the interface between second surface 26 and switchplate 16. It should be understood that although the portion of signals 60 and 62 illustrated in FIG. 3A also exist in the operation of switch 10 illustrated in FIG. 3B, they are not explicitly illustrated in FIG. 3B so that other portions of signals 60 and 62 may be more clearly depicted. Switchplate 16 placed in proximal contact with second surface 26 of material 12 frustrates the total internal reflection of signals 60 and 62. In particular, switchplate 16 placed in proximal contact with second surface 26 frustrates the total internal reflection of signal 60 such that signal 60 propagates toward device 54 as illustrated in FIG. 3B. Similarly, switchplate 16 frustrates the total internal reflection of a large portion of signal 62 such that signal 62 propagates through first surface 24 in a direction indicated by arrow 64. In this respect, the majority of cross-talk signal 62 is directed away from any of devices 50–54 and, therefore, switch 10 reduces the effects of cross-talk signal 62.

Total internal reflection at second surface 26 of material 12 may or may not result in a second cross-talk signal 66. Second cross-talk signal 66, if it exists at all, comprises a small percentage of cross-talk signal 62. Because cross-talk signal 62 comprises a small percentage of original signal 60, cross-talk signal 66 comprises a negligible portion of original signal 60. In this respect, FIG. 3B illustrates the advantageous effects of a second reflection of signals 60 at the interface between surface 26 and switchplate 16. The reduction in the effects of cross-talk signals in switch 10 is referred to as a cross-talk improvement.

Another technical advantage of the present invention relates to the cross-talk improvement described above. Generally, cross-talk signal 62 described above is generated as a result of imperfections in the components of optical switch 10, such as imperfections in surface 30 of switchplate 16 and in surface 26 of refractive material 12, or in less than ideal performance by actuator 20 which results in a slight air gap at the interface between switchplate 16 and second surface 26. For example, if surface 26 of material 12 and surface 30 of switchplate 16 are not manufactured within precise design tolerances, or if actuator 20 does not perform ideally, switchplate 16 does not frustrate the total internal reflection of the entire signal 60 when placed in proximate contact with material 12. Cross-talk signal 62 may be generated as a result of these manufacturing defects and/or as a result of less than ideal performance by actuator 20.

By reducing the magnitude of cross-talk signal 62 to acceptable levels during the operation of optical switch 10 using the double pass reflection technique described above, manufacturing tolerances for the components used in switch 10 may be increased and the performance of switch 10 may still meet industry standards for low levels of cross-talk. As a result of the double reflection of signal 60 at the interface between surface 26 and switchplate 16, the components of switch 10 can also overcome environmental contamination that results during the operation of the switch. In addition to supporting increased manufacturing tolerances for the optical components of switch 10, the double pass reflection techniques described above allows the performance requirements of actuator 20 to be relaxed. For example, the degree of proximal contact to which actuator 20 brings switchplate 16 and surface 26 may be relaxed and still provide acceptable cross-talk performance during the operation of switch 10.

Figure 4A:
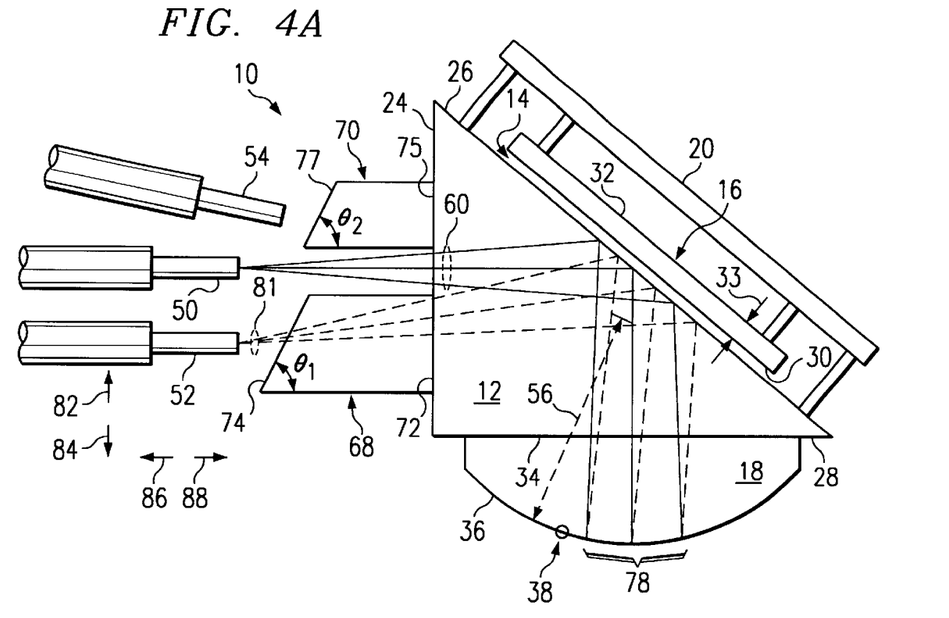
FIGS. 4A and 4B illustrate the first embodiment of the optical switch using spacers.
Figure 4B:
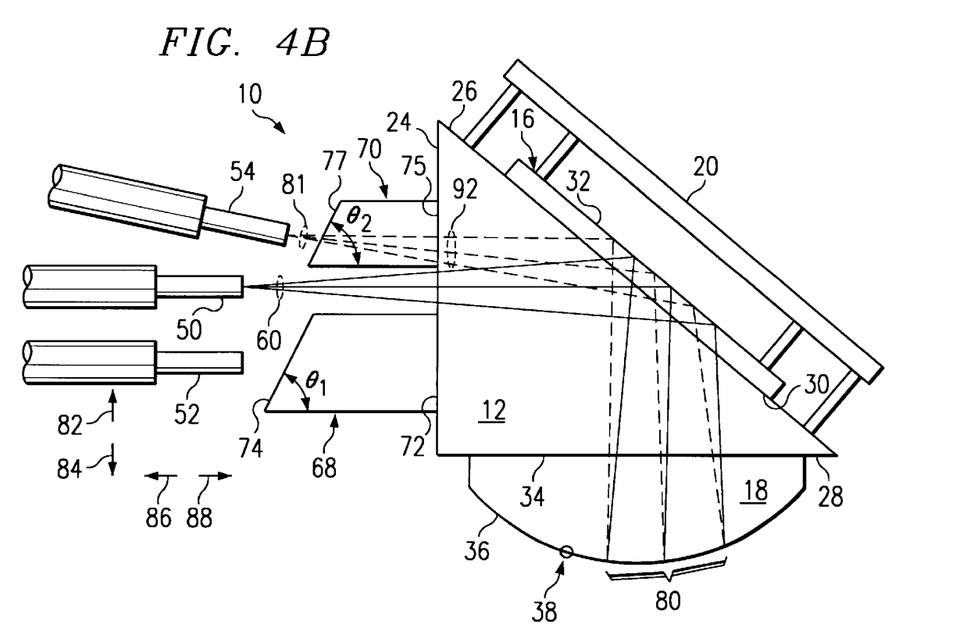

FIGS. 4A and 4B illustrate another embodiment of switch 10 that includes spacers 68 and 70. Spacers 68 and 70 comprise a lens, a rhomboid, a prism or any other suitable configuration of optically transmissive material, such as glass. Spacers 68 and 70 have an index of refraction substantially similar to first refractive material 12 such that spacers 68 and 70 do not substantially reflect, alter, or modify optical signal 60. Spacers 68 and 70 have first faces 72 and 75, respectively, that are substantially parallel to first surface 24 of material 12. Spacers 68 and 70 have second faces 74 and 77 at bias angles $\theta_1$ and $\theta_2$ to first faces 72 and 75, respectively. In general, spacers 68 and 70 operate to position devices 52 and 54 with respect to material 12.

Referring to the operation of switch 10 having spacers 68 and 70 when switchplate 16 is spaced apart from material 12, total internal reflection of signal 60 at surface 26 of material 12 causes the beams of optical signal 60 to converge to a focal point 81 as it propagates toward device 52, as illustrated using dashed lines in FIG. 4A. The position of focal point 81 may be predetermined based upon radius of curvature 56 of convex surface 36 of lens 18. Moreover, the position of device 52 may be predetermined based upon the determined position of focal point 81 of signal 60. If convex surface 36 of lens 18 is not accurately manufactured according to precise design specifications, however, then the position of focal point 81 of signal 60 may be altered and, therefore, device 52 may be misaligned.

A technical advantage of the present invention is the use of spacers 68 and 70 to overcome the misalignment problems caused by manufacturing defects in switch 10. For example, spacer 68 may be maneuvered along surface 24 in a direction indicated by arrows 82 and 84. In response, device 52, abutting second face 74 of spacer 68, may be maneuvered in a direction indicated by arrows 86 and 88 to modify the position of device 52 with respect to first face 24 of material 12. By maneuvering spacer 68 and device 52 as described above, the position of device 52 may be "tuned" such that device 52 is aligned substantially coincident with focal point 81 of signal 60. In this respect device 52 receives a maximum amount of signal 60.

Referring now to the operation of switch 10 having spacers 68 and 70 when switchplate 16 is placed in proximal contact with material 12, total internal reflection of signal 60 at surface 32 of switchplate 16 causes the beams of optical signal 60 to converge toward focal point 81 as it propagates toward device 54, as illustrated using dashed lines in FIG. 4B. The position of focal point 81 of signal 60 in this operation of switch 10 is based upon radius of curvature 56 of convex surface 36 and thickness 33 of switchplate 16. Therefore, if either convex surface 36 of lens 18 or switchplate 16 is not accurately manufactured according to particular design specifications, then the position of focal point 81 of signal 60 may be altered and, as a result, device 54 may be misaligned.

As described above with reference to spacer 68, spacer 70 may be maneuvered in a direction indicated by arrows 82 and 84. In response, device 54, abutting second face 77 of spacer 70, may be maneuvered in a direction indicated by arrows 86 and 88 to modify the position of device 54 with respect to first face 24 of material 12. By maneuvering spacer 70 and device 54 as described above, the position of device 54 may be "tuned" such that device 54 is aligned substantially coincident with focal point 80 of signal 60. In this respect, device 54 receives a maximum portion of signal 60.

A technical advantage provided by the present invention is that spacers 68 and 70 may be operated to reposition devices 52 and 54, respectively, with respect to material 12 even after the components of switch 10 are manufactured. Thus, even if the precise design specifications of the components for switch 10 have not been met, spacers 68 and 70 may position devices 52 and 54, respectively, to coincide substantially with focal point 81 of signal 60.

Figure 5A:
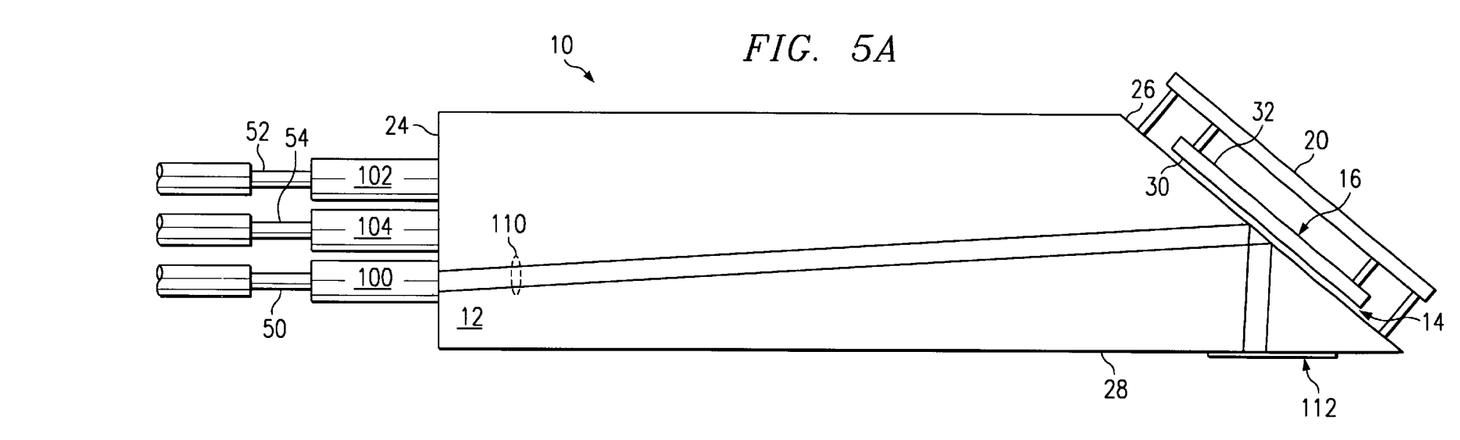
FIGS. 5A and 5B illustrate a second embodiment of the optical switch operating in an unswitched mode.
Figure 5B:
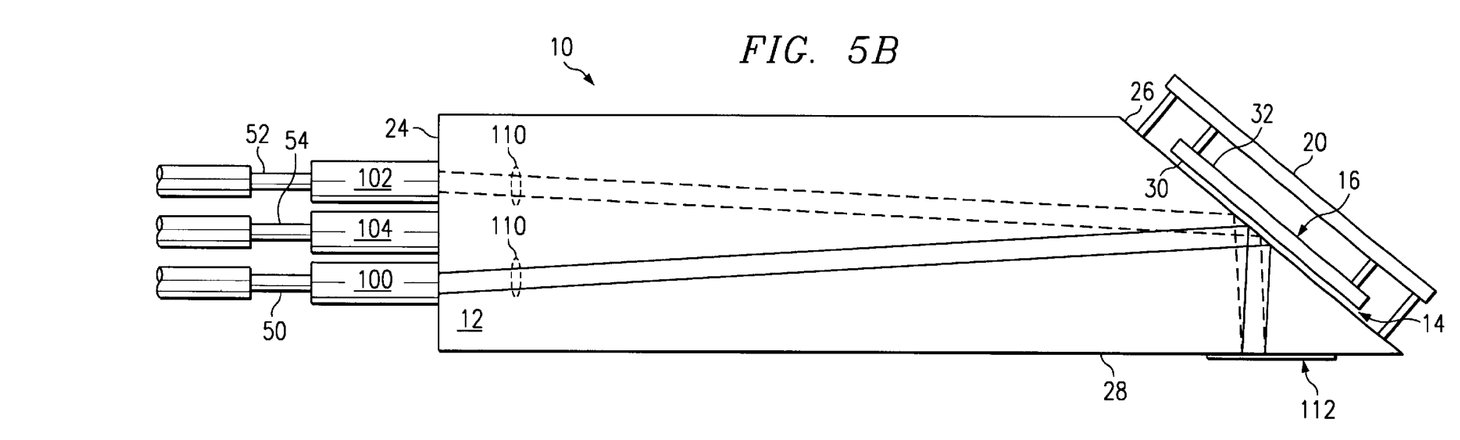

FIGS. 5A and 5B illustrate a second embodiment of optical switch 10 that includes materials 12 and 14, a switchplate 16 coupled to material 12 using actuator 20, a collimating lens 100 coupled to material 12, a first decollimating lens 102 coupled to material 12, and a second decollimating lens 104 coupled to material 12. In general, collimating lens 100 collimates optical signal 60 received from device 50 to generate a collimated beam 110. Optical switch 10 communicates collimated beam 110 to first decollimating lens 102 when switchplate 16 is spaced apart from material 12, as described with reference to FIGS. 5A and 5B. Once switchplate 16 is placed in proximal contact with material 12, optical switch 10 communicates collimated beam 110 to second decollimating lens 104 as described with reference to FIGS. 6A and 6B.

Collimating lens 100 comprises glass or any other suitable optically transmissive material that collimates optical signal 60 into a collimated beam 110. Decollimating lenses 102 and 104 comprise glass or any other suitable optically transmissive material that decollimate and focus collimated beam 110 into optical signal 60 for communication to devices 52 and 54, respectively. In a particular embodiment, lenses 100–104 comprise gradient index (GRIN) lenses. The following description of lenses 100–104 may refer to both "one-quarter" and "one-half" pitch GRIN lenses. It should be understood that these terms contemplate and intend to cover GRIN lenses with adjustments in length that vary from one-quarter and one-half pitch to fine tune the collimation and decollimation of optical beam 110, or the overall performance of switch 10.

Figure 6A:
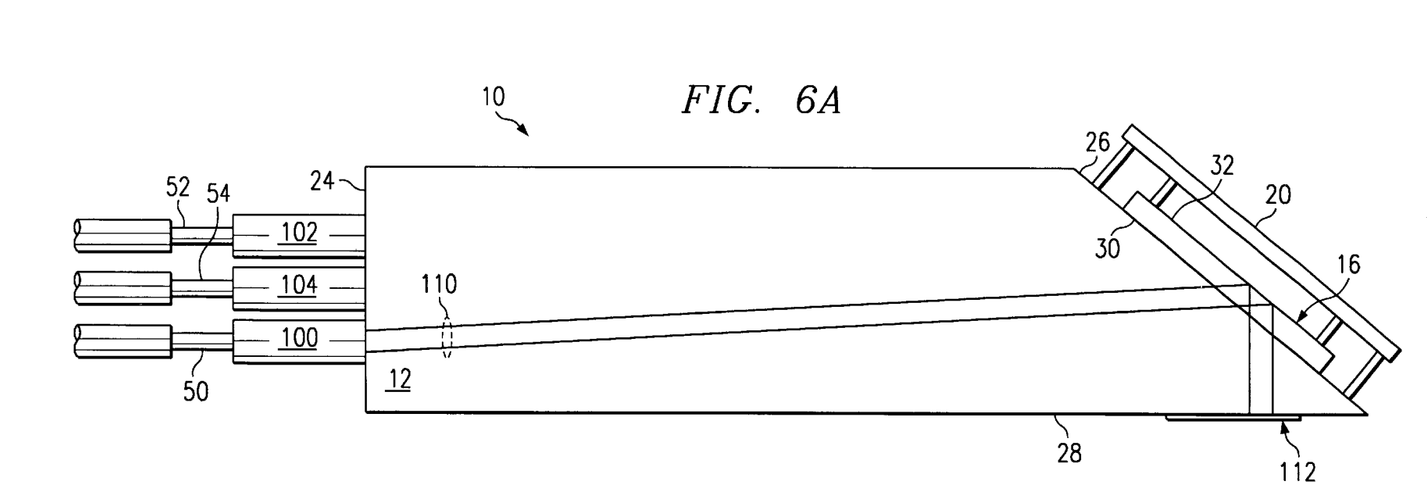
FIGS. 6A and 6B illustrate the second embodiment of the optical switch operating in a switched mode.
Figure 6B:
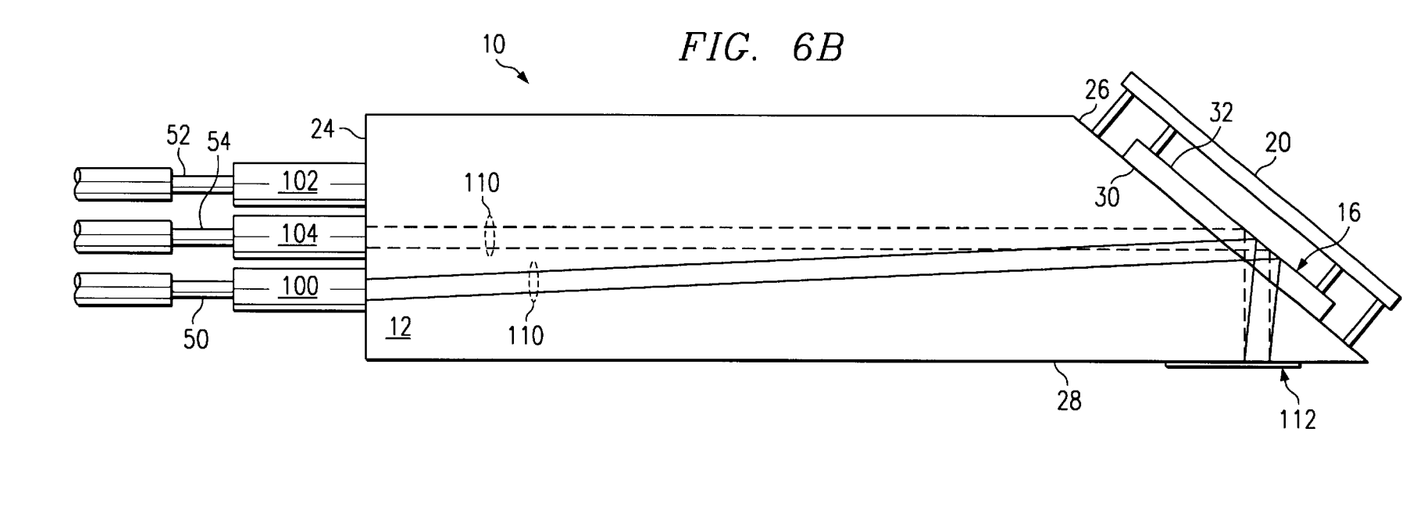
Figure 7A:
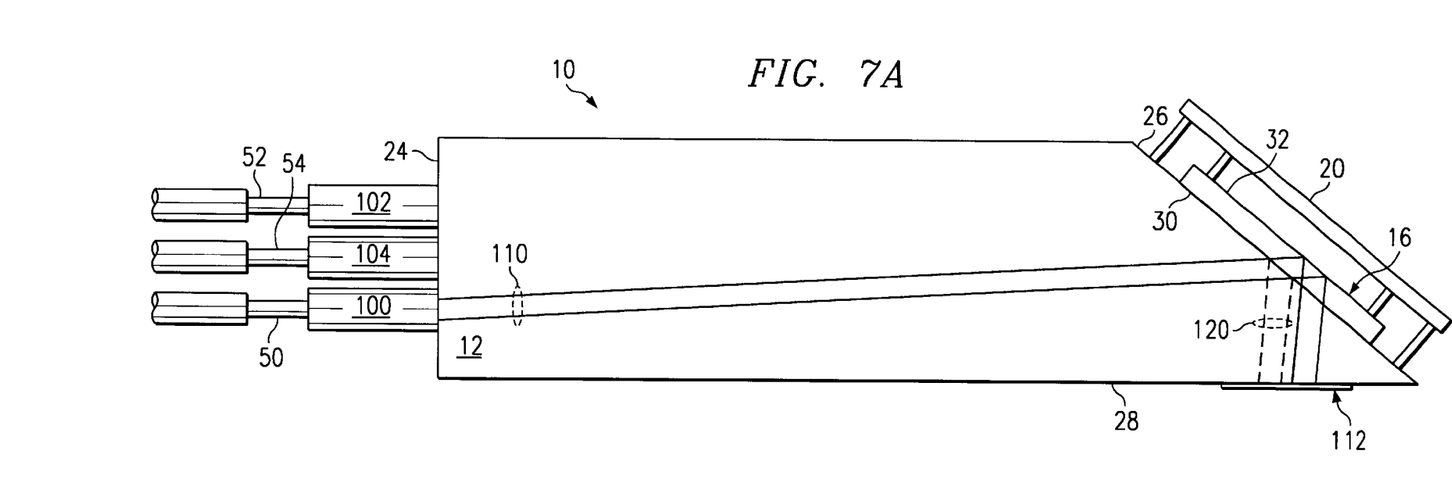
FIGS. 7A and 7B illustrate the second embodiment of the optical switch processing a cross-talk signal.
Figure 7B:
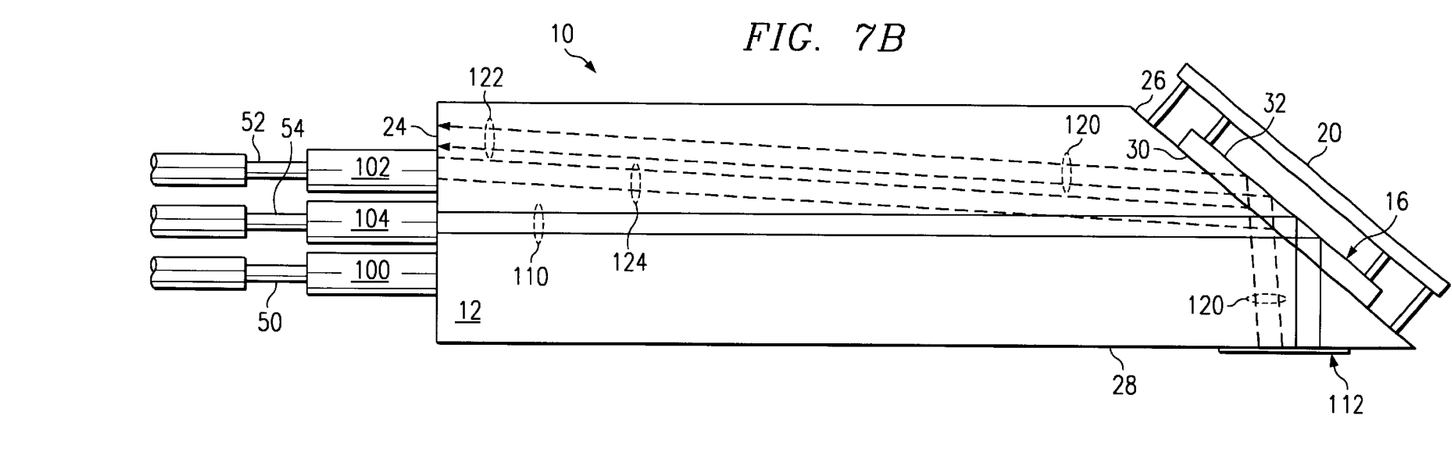

In one embodiment of switch 10 illustrated in FIGS. 5–7, a portion of third surface 28 of material 12 comprises a coating 112. Coating 112 may be any suitable material that increases the reflectivity of surface 28. Alternatively, third surface 28 may totally internally reflect beam 110.

In operation of optical switch 10 with switchplate 16 spaced apart from second surface 26 of material 12, as illustrated in FIG. 5A, optical switch 10 receives collimated beam 110 from collimating lens 100, such that collimated beam 110 propagates through first surface 24 and toward second surface 26. Total internal reflection at the interface between material 14 and second surface 26 of material 12 directs collimated beam 110 toward third surface 28 of material 12.

Referring to FIG. 5B, third surface 28 of material 12 reflects collimated beam 110. The reflected beam 110 is illustrated using dashed lines. Total internal reflection at second surface 26 directs collimated beam 110 toward decollimating lens 102. Decollimating lens 102 decollimates and focuses collimated beam 110 into output optical device 52. Therefore, FIGS. 5A and 5B together illustrate the operation of switch 10 with switchplate 16 spaced apart from material 12.

In operation of switch 10 with switchplate 16 placed in proximate contact with material 12, as illustrated in FIG. 6A, collimated lens 100 collimates optical signal 60 into collimated beam 110 propagating toward second surface 26. Actuator 20 places switchplate 16 in proximal contact with surface 26 of material 12. Switchplate 16 frustrates the total internal reflection of collimated beam 110 at surface 26. Reflective surface 32 of switchplate 16 directs collimated beam 110 toward third surface 28 of material 12.

Referring to FIG. 6B, third surface 28 of material 12 reflects collimated beam 110 toward switchplate 16. The reflection of collimated beam 110 is illustrated using dashed lines. Switchplate 16 again frustrates the total internal reflection of beam 110 at surface 26. Reflective surface 32 of switchplate 16 directs collimated beam 110 toward decollimating lens 104. Decollimating lens 104 decollimates and focuses collimated beam 110 into output optical device 54. Therefore, FIGS. 6A and 6B together illustrate the operation of switch 10 with switchplate 16 placed in proximate contact with material 12.

FIGS. 7A and 7B illustrate an advantageous operation of switch 10 that reduces the effects of cross-talk beams in switch 10. Referring to FIG. 7A, in operation of switch 10 with switchplate 16 placed in proximate contact with material 12, collimating lens 100 collimates optical signal 60 into collimated beam 110 propagating toward second surface 26 of material 12. Ideally, switchplate 16 frustrates the total internal reflection of the entire collimated beam 110 at surface 26 such that collimated beam 110 is reflected by surface 32 of switchplate 16, as illustrated using solid lines for collimated beam 110. Total internal reflection of a small portion of beam 110 at second surface 26 of material 12 results in a first cross-talk beam 120, as illustrated using dashed lines. Therefore, FIG. 7A illustrates the effects of a first reflection of collimated beam 110 at the interface between surface 26 and switchplate 16. The negative effects of cross-talk beam 120 are realized if an optical device 50–54 receives and further processes beam 120. As described above with reference to FIGS. 3A–3B, an advantage provided by the present invention is that switch 10 uses the double pass reflection technique to further process cross-talk beam 120 so that a large portion of beam 120 is not received by input device 50, output devices 52 or 54, or any other optical component of switch 10.

Referring to FIG. 7B, third surface 28 of material 12 reflects collimated beams 110 and 120 toward second surface 26 for a second reflection at the interface between second surface 26 and switchplate 16. It should be understood that although the portion of beams 110 and 120 illustrated in FIG. 7A also exist in the operation of switch 10 illustrated in FIG. 7B, they are not explicitly illustrated in FIG. 7B so that other portions of beams 110 and 120 may be more clearly depicted. Switchplate 16 placed in proximal contact with second surface 26 of material 12 frustrates the total internal reflection of beams 110 and 120. In particular, switchplate 16 placed in proximal contact with second surface 26 frustrates the total internal reflection of beam 110 such that beam 110 propagates toward device 54 as illustrated in FIG. 7B. Similarly, switchplate 16 frustrates the total internal reflection of a large portion of beam 120 such that beam 120 propagates through first surface 24 in a direction indicated by arrows 122. In this respect, the majority of cross-talk beam 120 is directed away from any of devices 50–54 and, therefore, switch 10 reduces the effects of cross-talk beam 120.

Total internal reflection at second surface 26 of material 12 will result in a second cross-talk beam 124. However, second cross-talk beam 124 comprises a small percentage of cross-talk beam 120. Because cross-talk beam 120 already comprises a small percentage of collimated beam 110, cross-talk beam 124 comprises a negligible portion of collimated beam 110. In this respect, FIG. 7B illustrates the advantageous effect of a second reflection of collimated beam 110 at the interface between second surface 26 and switchplate 16.

As described above with reference to FIG. 3B, the double reflection techniques of switch 10 result in an improvement that reduces the magnitude of cross-talk beam 120. Accordingly, the components of switch 10 may be manufactured and/or operated with increased tolerances and the performance of switch 10 may still meet industry standards for low levels of cross-talk.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. An optical switch for processing an optical signal, comprising:
   a refractive material having a first surface, a second surface, and a third surface;
   a lens having a planar surface coupled to the third surface of the refractive material and a convex surface; and
   a switchplate coupled to the second surface of the refractive material, the switchplate having a first position spaced apart from the second surface such that the second surface totally internally reflects an optical signal toward the convex surface of the lens and the second surface totally internally reflects the optical signal reflected by the convex surface to a first output optical device, and the switchplate having a second position in proximal contact with the second surface to frustrate the total internal reflection of the optical signal such that the switchplate totally internally reflects the optical signal toward the convex surface of the lens and the switchplate totally internally reflects the optical signal reflected by the convex surface toward a second output optical device.

2. The optical switch of claim 1, wherein the first output optical device comprise a first optical fiber operable to receive the optical signal when the switchplate is placed in the first position, and the second output optical device comprises a second optical fiber operable to receive the optical signal when the switchplate is placed in the second position.

3. The optical switch of claim 1, wherein the switchplate further comprises a reflective surface and a contact surface.

4. The optical switch of claim 1, further comprising an actuator coupled to the switchplate and operable to position the switchplate in a selected one of the first position and the second position in response to a control signal.

5. The optical switch of claim 1, further comprising a spacer abutting the first output optical device and operable to vary controllably the distance between the first output optical device and the first surface of the refractive material.

6. The optical switch of claim 5, wherein the spacer comprises a first face substantially parallel to the first surface of the refractive material and a second face at a bias angle to the first face.

7. The optical switch of claim 5, further comprising a second spacer abutting the second output optical device and operable to vary controllably the distance between the second output optical device and the first surface of the refractive material.

8. The optical switch of claim 1, wherein the convex surface further comprises a reflective coating operable to reflect the optical signal.

9. The optical switch of claim 1, wherein the optical signal diverges toward the second surface of the refractive material, and the convex surface reflects the optical signal such that it converges toward the first surface of the refractive material.

10. The optical switch of claim 1, further comprising an input optical device operable to communicate the optical signal to the first surface of the refractive material, wherein the position of the first output optical device with respect to the input optical device is determined in response to a radius of curvature of the convex surface.

11. The optical switch of claim 1, further comprising an input optical device operable to communicate the optical signal to the first surface of the refractive material, wherein the position of the second output optical device with respect to the input optical device is determined in response to a radius of curvature of the convex surface and a thickness of the switchplate.

12. The optical switch of claim 1 wherein:
   the refractive material has a first index of refraction;
   the switchplate has a second index of refraction substantially similar to the first index of refraction; and
   the lens has a third index of refraction substantially similar to the first index of refraction.

13. A method for processing an optical signal, comprising:
   receiving an optical signal at a first surface of a refractive material, wherein the optical signal diverges as it propagates toward the first surface of the refractive material;
   totally internally reflecting the optical signal at a second surface of the refractive material toward a lens coupled to a third surface of the refractive material, wherein the lens comprises a convex surface;
   reflecting the optical signal at the convex surface toward the second surface of the refractive material; and
   totally internally reflecting the optical signal at the second surface of the refractive material such that the optical signal converges toward an output optical device.

14. The method of claim 13, wherein the output optical device comprises a first output optical device and further comprising:
   placing a switchplate in proximal contact with the second surface of the refractive material to frustrate the total internal reflection of the optical signal;
   totally internally reflecting the optical signal at a reflective surface of the switchplate toward the convex surface;
   reflecting the optical signal at the convex surface toward the reflective surface of the switchplate; and
   reflecting the optical signal at the reflective surface of the switchplate such that the optical signal converges toward a second output optical device.

15. The method of claim 14, wherein the convex surface of the lens is characterized by a radius of curvature, the method further comprising:
   placing the first output optical device at a first position with respect to an input optical device determined in response to the radius of curvature of the convex surface; and
   placing the second output optical device at a second position with respect to the input optical device determined in response to the radius of curvature of the convex surface and a thickness of the switchplate.

16. The method of claim 13, wherein:
   the refractive material has a first index of refraction;
   the switchplate has a second index of refraction substantially similar to the first index of refraction; and the lens has a third index of refraction substantially similar to the first index of refraction.

17. The method of claim 13, further comprising positioning a spacer to control the distance between the output optical device and the first surface of the refractive material.

18. The method of claim 17, wherein the spacer comprises:
a first face substantially parallel to the first surface of the refractive material; and
a second face at a bias angle to the first face and coupled to the output optical device.

19. The method of claim 17, wherein the step of positioning the spacer comprises controllably varying the distance between the output optical device and the first surface of the refractive material in response to a radius of curvature of the convex surface.

20. The method of claim 17, further comprising positioning a second spacer to control the distance between the second output optical device and the first surface of the refractive material.

21. The method of claim 20, wherein the spacer comprises:
a first face substantially parallel to the first surface of the refractive material; and
a second face at a bias angle to the first face and coupled to the second output optical device.

22. The method of claim 20, wherein the step of positioning the spacer comprises controllably varying the distance between the second output optical device and the first surface of the refractive material in response to a radius of curvature of the lens and a thickness of the switchplate.

23. A system for positioning an output optical device, comprising:
an output optical device;
an optical switch operable to communicate an optical signal that converges at a focal point; and
a spacer abutting the output optical device and operable to vary controllably the position of the output optical device with relation to the optical switch such that the output optical device substantially coincides with the focal point of the optical signal;
wherein the optical switch comprises a convex surface characterized by a radius of curvature and the spacer is operable to position the output optical device in response to the radius of curvature of the convex surface.

24. A system for positioning an output optical device, comprising:
an output optical device;
an optical switch operable to communicate an optical signal that converges at a focal point; and
a spacer abutting the output optical device and operable to vary controllably the position of the output optical device with relation to the optical switch such that the output optical device substantially coincides with the focal point of the optical signal;
wherein the optical switch comprises a switchplate and a convex surface characterized by a radius of curvature, and the spacer is operable to position the output optical device in response to the radius of curvature of the convex surface and a thickness of the switchplate.

25. A system for positioning an output optical device, comprising:
an output optical device;
an optical switch operable to communicate an optical signal that converges at a focal point; and a spacer abutting the output optical device and operable to vary controllably the position of the output optical device with relation to the optical switch such that the output optical device substantially coincides with the focal point of the optical signal;
wherein the spacer comprises a refractive material having a first face and a second face at a bias angle to the first face.

26. An optical switch, comprising:
a refractive material having a first surface, a second surface, and a third surface;
a collimating lens coupled to the first surface of the refractive material;
a first decollimating lens coupled to the first surface of the refractive material;
a second decollimating lens coupled to the first surface of the refractive material; and
a switchplate coupled to the second surface of the refractive material, the switchplate having a first position spaced apart from the second surface such that the second surface totally internally reflects a collimated beam toward the third surface of the refractive material and the second surface totally internally reflects the collimated beam reflected by the third surface to a first output optical device coupled to the first decollimating lens, and the switchplate having a second position in proximal contact with the second surface to frustrate the total internal reflection of the collimated beam such that the switchplate totally internally reflects the collimated beam toward the third surface and the switchplate totally internally reflects the collimated beam reflected by the third surface toward a second output optical device coupled to the second decollimating lens.

27. The optical switch of claim 26, wherein the first output optical device comprises a first optical fiber operable to receive the optical signal when the switchplate is placed in the first position, and the second output optical device comprises a second optical fiber operable to receive the optical signal when the switchplate is placed in the second position.

28. The optical switch of claim 26, wherein the switchplate further comprises a reflective surface and a contact surface.

29. The optical switch of claim 26, further comprising an actuator coupled to the switchplate and operable to position the switchplate in a selected one of the first position and the second position in response to a control signal.

30. The optical switch of claim 26, wherein the third surface of the refractive material further comprises a reflective coating operable to reflect the optical signal.

31. The optical switch of claim 26, wherein the first collimating lens comprises a GRIN lens.

32. The optical switch of claim 26, wherein the first decollimating lens comprises a first GRIN lens and the second decollimating lens comprises a second GRIN lens.

33. The optical switch of claim 26, wherein the collimating lens collimates an optical signal into the collimated beam.

34. The optical switch of claim 26, wherein:
the first decollimating lens decollimates and focuses the collimated beam into the first output optical device when the switchplate is placed in the first position; and
the second decollimating lens decollimates and focuses the collimated beam into the second output optical device when the switchplate is placed in the second position.

35. A method for processing an optical signal, comprising:

collimating an optical signal into a collimated beam using a collimating lens;

receiving the collimated beam at a first surface of a refractive material;

totally internally reflecting the collimated beam at a second surface of the refractive material toward a third surface of the refractive material;

reflecting the collimated beam at the third surface toward the second surface of the refractive material;

totally internally reflecting the collimated beam at the second surface of the refractive material toward a decollimating lens; and decollimating and focusing the collimated beam to an output optical device using the decollimating lens.

36. The method of claim 35, wherein the output optical device comprises a first output optical device and the decollimating lens comprises a first decollimating lens, the method further comprising:

placing a switchplate in proximal contact with the second surface of the refractive material to frustrate the total internal reflection of the collimated beam;

totally internally reflecting the collimated beam at a reflective surface of the switchplate toward the third surface of the refractive material;

reflecting the collimated beam at the third surface toward the reflective surface of the switchplate;

reflecting the collimated beam at the reflective surface of the switchplate toward a second decollimating lens; and decollimating and focusing the collimated beam to a second output optical device using the second decollimating lens.

37. The method of claim 35, wherein the first output optical device comprise a first optical fiber, and the second output optical device comprises a second optical fiber.

38. The method of claim, 35, wherein the third surface of the refractive material further comprises a reflective coating.

39. The method of claim 35; wherein the collimating lens comprises a GRIN lens.

40. The method of claim 36, wherein the first decollimating lens comprises a first GRIN lens and the second decollimating lens comprises a second GRIN lens.

* * * * *